Feb. 25, 1930.                    T. C. HOLLIDAY                    1,748,769
                              DIRIGIBLE HEADLIGHT
                      Filed March 24, 1928        2 Sheets-Sheet 1
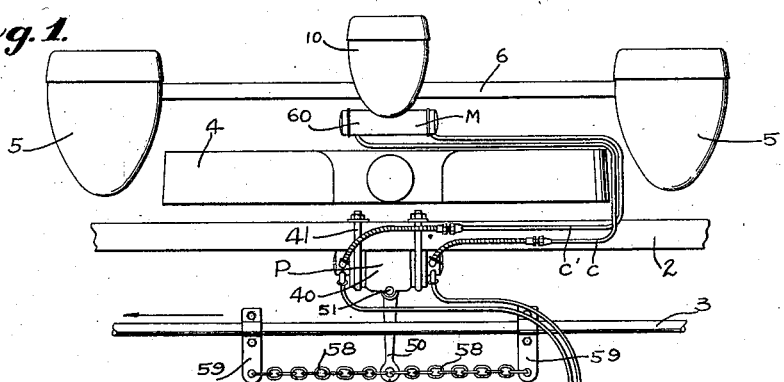
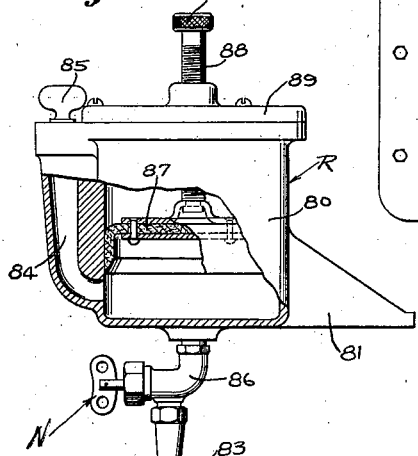
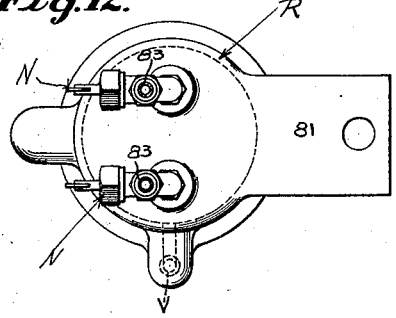
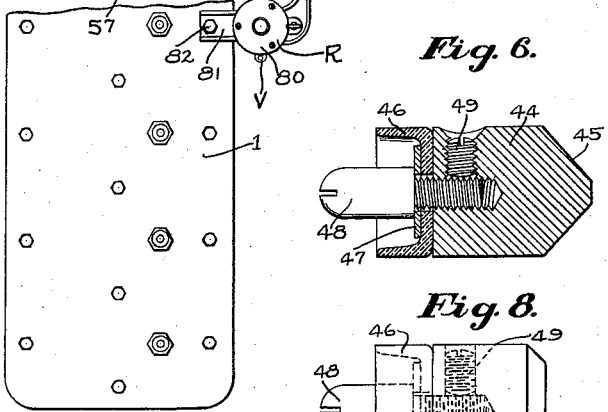
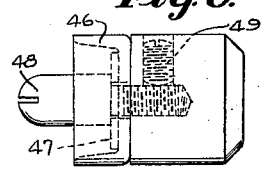
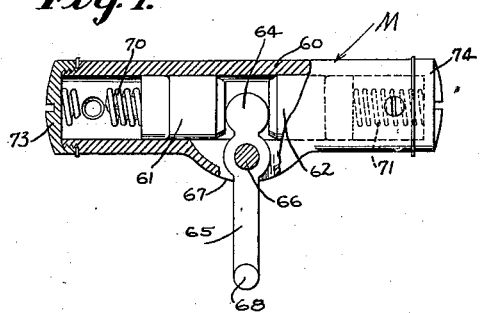
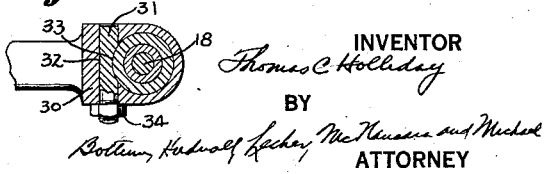

Feb. 25, 1930.  T. C. HOLLIDAY  1,748,769
DIRIGIBLE HEADLIGHT
Filed March 24, 1928   2 Sheets-Sheet 2
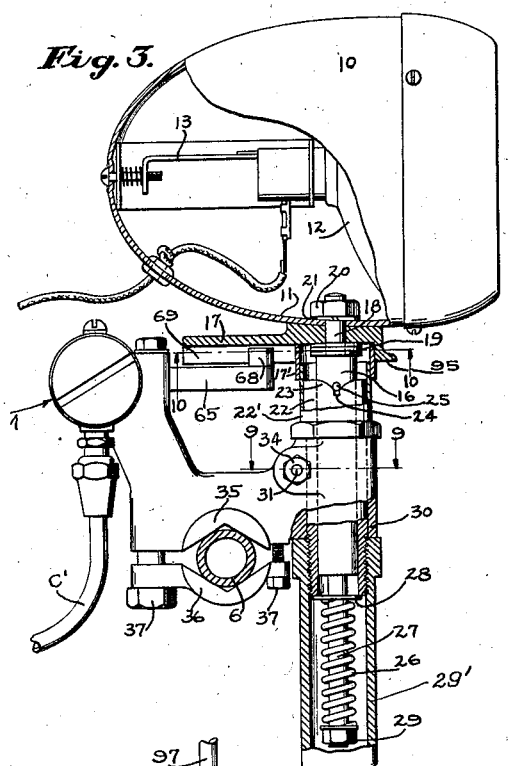
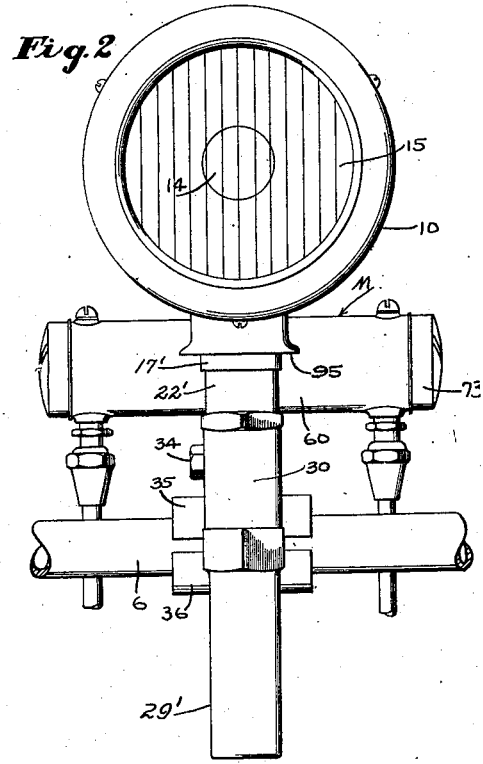
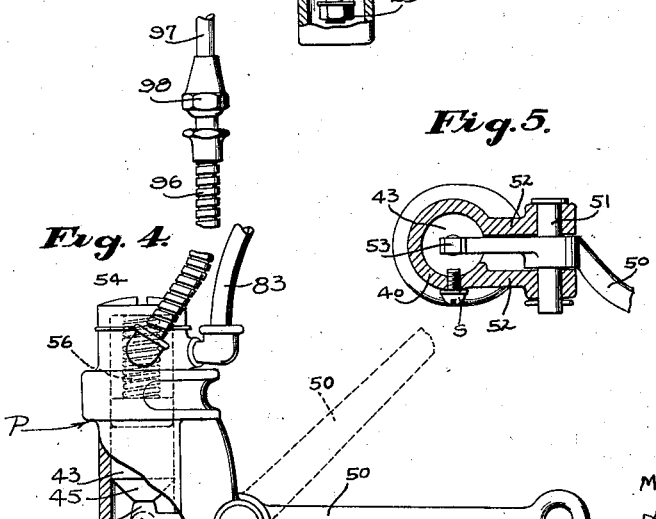
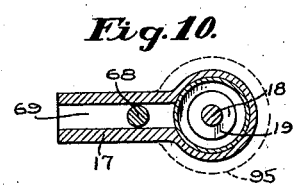
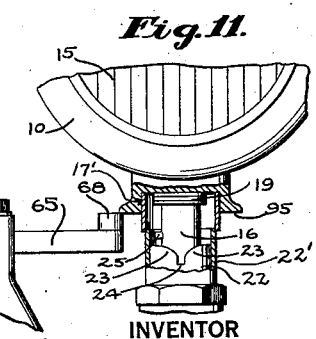
INVENTOR
Thomas C. Holliday
BY
ATTORNEY Patented Feb. 25, 1930

1,748,769

UNITED STATES PATENT OFFICE

THOMAS C. HOLLIDAY, OF JACKSON, MISSISSIPPI, ASSIGNOR TO HOLLIDAY LIFE SAVING HEADLIGHT COMPANY, OF JACKSON, MISSISSIPPI, A CORPORATION OF MISSISSIPPI

DIRIGIBLE HEADLIGHT

Application filed March 24, 1928. Serial No. 264,316.

This invention relates to a dirigible vehicle light or head light and more particularly to a vehicle light of this character designed, adapted and controlled to follow automatically the curves of the road over which the vehicle is travelling.

One of the principal objects of the present invention is to provide an auxiliary vehicle light of this character in addition to the headlights with which the vehicle is ordinarily equipped and which is hydraulically operated from the steering gear of the vehicle in a simple and effective manner to illuminate the road properly when rounding curves. When desired, the auxiliary headlight may be readily and easily disconnected from its automatic hydraulic drive and manually rotated through any desired angular interval to provide a trouble light for illuminating the power plant of the vehicle or for affording illumination to facilitate the changing of a tire or the like at night.

Another object is to provide a hydraulically operated vehicle light or head light of this character which is so organized with the steering gear of the vehicle that only so much of the motion of the steering gear is utilized as is necessary to properly turn the head light, the motion of the steering gear in excess of that required for the operation of the light being substantially unrestrained and occurring without its being imparted to the hydraulic mechanism or to the auxiliary light.

In general, the object of the invention is to provide a dirigible head light which is extremely simple and durable, which is reliable and effective in operation, which lends itself to economical manufacture, and which is adapted for installation and use upon various makes of cars without any changes in its construction or design.

In carrying out the present invention, an auxiliary head light or vehicle light is provided and is supported on any suitable or desirable part of the vehicle.

A novel mounting is provided for the head light which normally holds it straight ahead but which permits it to be turned to follow the road as the vehicle moves around curves.

The means employed for automatically turning the light includes a steering gear operated fluid pressure pump which may be mounted on the front axle and operated from the tie rod of the steering gear. Preferably the pump includes a cylinder and a pair of oppositely disposed pistons fitted in the cylinder. Means is provided for actuating the pistons from the tie rod and may comprise an actuating lever having one end interposed between the pistons, the actuating lever having an intermediate portion fulcrumed on the cylinder and having its opposite end connected by means of chains or other flexible elements to the tie rod. Springs in the ends of the cylinder operate to hold the pistons engaged with the interposed end of the lever. The ends of the pistons engaged with the actuating lever are reduced or beveled so that only so much of the motion of the tie rod will be imparted to the pistons as is necessary to properly operate the same. A stop is provided for limiting the motion of the piston not positively actuated by the actuating lever.

On the mounting of the head light, a fluid pressure motor is carried and also includes a cylinder and a pair of oppositely disposed pistons fitted therein. Means is provided for transmitting motion from the motor pistons to the auxiliary head light and may comprise a lever fulcrumed on the cylinder and having one end interposed between and actuated by the pistons, the opposite end of the lever carrying a pin which fits in a slot formed in an arm fixed to the auxiliary head light casing. The motor pistons are held engaged with their lever by means of springs and are actuated from the pump by fluid pressure exerted through pipe lines which connect the ends of the pump cylinder to the ends of the motor cylinder.

For maintaining the proper supply of operating fluid in the hydraulic system, an auxiliary reservoir is mounted on a convenient part of the vehicle and has valve controlled pipe lines leading to the ends of the pump cylinder. In this auxiliary reservoir, a force feed device is had for forcing the fluid into the pump cylinder and for maintaining a pressure thereon when desired.

The mounting of the auxiliary light and its connection with the motor permit it to be adjusted manually for use as a trouble light.

Other objects and advantages reside in certain novel features of the construction, arrangement and combination of parts which will be hereinafter more fully described and particularly pointed out in the appended claims, reference being had to the accompanying drawings forming a part of this specification, and in which:—

Figure 1 is a diagrammatic plan view illustrating how the light embodying the present invention is organized with a motor vehicle such as an automobile;

Figure 2 is a fragmentary view in front elevation illustrating the head light mounted on the brace rod between the head lights ordinarily employed;

Figure 3 is a view partly in side elevation and partly in central vertical longitudinal section further illustrating the parts shown in Figure 2;

Figure 4 is a view partly in plan and partly in horizontal section illustrating the construction of the pump;

Figure 5 is a view in section taken on line 5—5 of Figure 4, parts being shown in elevation for the sake of simplicity in illustration;

Figure 6 is a detail view partly in section and partly in elevation illustrating the construction of a pump piston;

Figure 7 is a detail view partly in horizontal section and partly in top plan illustrating the construction of the fluid pressure motor employed;

Figure 8 is a detail view in elevation illustrating the construction of one of the motor pistons;

Figure 9 is a detail view in section on line 9—9 of Figure 3;

Figure 10 is a similar view in section on line 10—10 of Figure 3;

Figure 11 is a fragmentary view partly in section and partly in elevation illustrating the device as used as a trouble light;

Figure 12 is a bottom plan view of the auxiliary reservoir; and

Figure 13 is a view showing the auxiliary reservoir partly in side elevation and partly in vertical section.

In Figure 1 of the drawings portions of a motor vehicle such as an automobile are illustrated diagrammatically, 1 designating the engine, 2 the front axle, 3 the tie rod of the steering gear, 4 the radiator, 5 the head lights and 6 the brace rod extending between the head lights.

The auxiliary vehicle light or dirigible head light of the present invention is designated generally at 10 and may be of any conventional or suitable construction. As shown in Figures 2 and 3 the light 10 has a casing 11 within which a reflector 12 and a reflector and bulb mounting 13 are provided. An electric bulb 14 is provided in accordance with the usual practice. A lens 15 completes the equipment of the auxiliary head light.

A post 16 is secured to the head light casing and the same means employed for attaching the post to the casing may also be utilized for securing a slotted arm 17 thereto. For this purpose the upper end of the post 16 is provided with a reduced extension 18 which passes through an opening in the arm 17 and through an opening in the lower portion of the casing 11. Washers 19 may be provided between the arm 17 and the shoulder on the post 16 presented at the juncture of the reduced extension 18 and the main portion of the post. Within the casing, a nut 20 is threaded on the reduced extension 18, a lock washer 21 being interposed between the nut 20 and the inside wall of the casing. When the nut 20 is tightened up, it firmly clamps both the arm 17 and the post 16 to the casing. The post 16 is rotatably fitted in a bearing sleeve 22. The upper end of this bearing sleeve 22 has downwardly inclined portions 23 terminating in a notch 24 located in between the lower ends of the downwardly inclined portions 23. A laterally projecting projection or pin 25 is fixed to the post 16 and normally rides on the upper end of the bearing sleeve 22. The post 16 is urged downwardly to maintain its pin 25 engaged with the upper end of the bearing sleeve 22 by means of a compression coil spring 26 encircling a reduced extension 27 provided at the lower end of the post. One end of this spring 27 engages a washer 28 loose on the extension 27 and abutting the lower end of the sleeve 22 while the other end of the spring engages a nut and washer assembly 29 adjustably secured on the lower end of the reduced extension 27 to provide an adjustable abutment for the lower end of the spring 26 whereby the spring may be appropriately compressed. With this arrangement the pin 25 is held engaged with the lower ends of the downwardly inclined portions 23 just above the notch 24. As the pin 25 is slightly larger than the notch, it cannot fit down thereinto and the arrangement automatically takes up wear and prevents undesirable vibration of the auxiliary light.

The bearing sleeve 22 is clamped rigidly in a tubular bracket 30 by means of a clamping bar 31 (see Figure 9) positioned in a transverse opening 32 formed in the bracket 30 and partially intersecting the opening which receives the sleeve 22. This clamping bar 31 has a curved camming portion 33 designed to enter into binding engagement with the periphery of the bearing sleeve 22 and to force the bar 31 into binding engagement with the wall of its opening 32 under the influence of a nut 34 threaded on one end of the bar 31 and bearing against the adjacent side of the tubular bracket 30. The bracket 30 may be mounted on any desirable part of the vehicle and is shown as being clamped to the brace rod 6, the bracket having a clamping member 35 integrally formed therewith. A co-operable clamping member 36 is provided and coacts with the clamping member 35 to secure the bracket 30 to the brace rod 6 under the influence of clamping screws 37. The portion of the post 16 below the bearing sleeve and the parts thereon are enclosed by a cap 29′. The portion of the post 16 below the head light and above the bearing sleeve and also the upper end of the bearing sleeve are enclosed by telescoping collars 17′ and 22′ relatively rotatable and carried by the arm 17 and sleeve 22, respectively.

The means for automatically turning the lamp with the steering wheels of the vehicle to cause the lamp to follow the turns in the road comprises in general a pump designated generally at P operated from the tie rod 3, a motor designated generally at M and connected with the light 10, conduits or pipe lines C and C′ connecting the pump and the motor, and an auxiliary reservoir R.

The pump P comprises a cylinder 40 which may be clamped to the front axle by U-bolts and nuts 41 (see Figure 1). In the cylinder 40, oppositely disposed pistons 42 and 43 are provided (see Figure 4). These pistons are of identical construction and as shown in Figure 6 each comprises a body portion 44 having one end reduced or beveled as at 45 and having a cup washer of leather designated at 46 fastened to its other end by means of a metallic washer 47 and a shouldered screw 48, the screw having its shoulder bearing against the washer 47 and having its threaded shank engaged with the threaded socket of the piston. A transversely extending lock screw 49 holds the screw 48 against accidental displacement.

Motion transmission means is provided between the tie rod 3 and the pistons 42 and 43 and may comprise an actuating lever 50 having an intermediate portion fulcrumed as at 51 on integral extensions 52 of the cylinder. In between the extensions the cylinder is slotted as shown in Figure 5 to provide the operating clearance for the lever 50. The inner end of the lever has a T-shaped head 53 integral therewith and this T-shaped head is interposed between and engaged with the beveled ends of the pistons 42 and 43.

On the ends of the cylinder, caps 54 are threaded and these caps 54 serve not only as closures for the ends of the cylinder, but also as abutments for compression coil springs 55 and 56, the springs 55 and 56 abutting the pistons 42 and 43 and operating to maintain the pistons engaged with the T-shaped head of the actuating lever. The end of the actuating lever opposite the head 53 is provided with an eye 57 which connects by means of chains 58 with lugs 59 fastened to the tie rod. Thus, whenever the tie rod shifts, as it does whenever the vehicle is steered around a curve, the lever 50 is swung to displace one or the other of the pistons 42 or 43 toward its end of the cylinder 40 and against the action of its spring to expel the liquid or fluid from such end of the cylinder and through the conduit C or C′ into one end of the cylinder 60 of the motor M.

In the cylinder 60 of the motor M oppositely disposed pistons 61 and 62 are also provided (see Figure 7) and are constructed exactly like the pistons 42 and 43 except that their inner ends need not be so pronouncedly beveled. In between the inner ends of these pistons 61 and 62 a rounded head 64 of a driven lever designated generally at 65 is interposed. This lever 65 is fulcrumed as at 66 on an extension of the cylinder 60 and operates through a slot 67 provided in this extension. At its forward end the lever 65 carries an upwardly projecting pin 68 which is operatively fitted in slot 69 formed in arm 17 (see Figures 3 and 10). Springs 70 and 71 engage respectively the pistons 61 and 62 and caps 73 and 74 closing the ends of the cylinder and these springs are compressed to maintain the pistons 61 and 62 engaged with the rounded head 64 of the lever 65 as shown in Figure 7.

For the purpose of maintaining the proper supply of oil or other fluid in the system of the hydraulic mechanism, an auxiliary reservoir designated at 80 is provided and may have an integral attaching bracket 81 bolted as at 82 to the engine block (see Figure 1). This reservoir has valve controlled flexible supply lines 83 leading therefrom to the opposite ends of the pump cylinder 40 (see Figures 1, 13 and 14). A filling passage 84 is provided on the reservoir 80 and communicates at its lower end with the bottom of the reservoir. The inlet of this passage 84 is closed by a removable filling plug 85. Although the oil may be supplied to the hydraulic system under gravity feed by supporting the reservoir above the level of the pump P and motor M, it may be desirable to have a force feed or to have the oil in the hydraulic system under pressure and provision is made for these features by fitting a piston or follower 87 in the reservoir 80 and controlling this follower 87 by a feed screw 88 swivelled to the follower and threadedly engaged with a removable head 89 at the upper end of the reservoir. A knurled head 90 at the upper end of the feed screw or other suitable means may be provided to facilitate turning of the feed screw 88. After the system has been filled the reservoir may be cut off from the hydraulic system by the valves 86 in the supply lines. When gravity feed is employed the reservoir is provided with a vent V. When force feed is utilized, this vent V is plugged up.

In operation when the steering wheels are turned to make a right hand turn, the tie rod 3 moves to the left as viewed in Figure 1. This swings the lever 50 in a clockwise direction and positively forces the piston 43 to the right thus expelling the oil from the right hand end of the pump cylinder 40 through the conduit C into the left hand end of the motor cylinder 60 and moving the piston 62 in the pump cylinder to the right, thus swinging the lever 65 in a counter-clockwise direction and rotating the auxiliary light 10 to the right (all as viewed in Figure 1) so that the light 10 follows the curve of the road.

This action of the piston 43 whereby it acts on the oil to cause it to exert pressure on and move the piston 62 of the motor M is facilitated by the piston 42 which moving inwardly under the influence of its spring 56 draws the oil from the end of the motor cylinder 60 in which the piston 61 is located (the right hand end in Figure 1 and the left hand end in Figure 7) and into the left hand end of the pump cylinder 40 (as viewed in Figure 1) thereby decreasing the resistance which the piston 61 presents to the travel or swing of the lever 65. When a left hand turn is made the levers 50 and 65 and pistons 42, 43, 61 and 62 are reversely moved to swing the light 10 to the left.

The conduits C and C' are made up in part at least of flexible piping and usually consist of flexible pipe sections 96 and copper tubing section 97 connected to each other and to the cylinders by compression couplings 98. The flexible supply lines 83 may be similarly constituted although shown as tubing for the sake of simplicity in illustration.

Frequently, the steering of the vehicle requires that the tie rod 3 partake of a movement of much greater amplitude than it is possible or practical to impart to the pistons of a hydraulic mechanism or to a light operated thereby and in order to utilize this tie rod 3 to actuate the pistons and yet dispose of this excessive motion, the pistons 42 and 43 have their ends reduced or beveled as described, which permit of continued movement of the actuating lever without any further movement of the pistons after the pistons have been moved as far as they need be. This is illustrated in dotted lines in Figure 4. When the front wheels of the car are facing straight ahead, the lever 50 is positioned as shown in Figure 1 and the ends of the T-shaped head 53 engage the flat reduced extremities of the beveled ends 45 of the pistons 42 and 43. Now, if the tie rod 3 is moved to the right as viewed in Figure 1 (as it is in making a left hand turn) the lever 50 is swung in a counter-clockwise direction as viewed in Figures 1 and 4. In the first stages of this movement, one end of the head 53 pushes the piston 42 toward its end cap 54 and this continues until the piston 42 has been moved through the proper distance at which time, if the lever 50 is still being swung, the head 53 of the lever slides off the flat inner extremity of the piston 42 and onto the bevelled surface thereof thereby holding the piston 40 advanced but not imparting any further movement thereto. The spring 56 causes the piston 43 to follow the piston 42 as long as movement is being imparted to the latter but when the head 53 rides onto the bevelled end of the piston 42 then the piston 43 engages and is held against a stop S projecting into the cylinder 40. Upon reverse movement of the tie rod the pistons are reversely operated in this manner. The piston travel is thus held within the proper limits even though the tie rod 3 partakes of a much greater movement.

In order to utilize the light 10 as a trouble light, it is merely necessary to pull the same upwardly to disengage the slot 69 of the arm from the pin 68. Then by rotating the light 10 the flange 95, integral with the arm 17, will be positioned to bear on the pin 68, as shown in Figure 11. This supports the head light 10 elevated and holds it in any angular adjustment that may be desirable. If the light 10 is elevated and rotated through 180° it will throw sufficient light through the radiator to illuminate the power plant or engine. By elevating and angling the light so that its beam just clears one side or the other of the radiator illumination is afforded to facilitate changing at night of a tire on that side of the vehicle to which the beam of light is directed.

The needle valves N incorporated in the supply lines 83 leading from the auxiliary reservoir to the opposite ends of the pump cylinder are normally closed and this makes the fluid in the pump and motor system entirely confined. By opening up these needle valves N and having the vent V open, the oil is free to move up into the auxiliary reservoir under the influence of the pump and consequently the lamp will not be moved. This may be desirable under some circumstances and is a very convenient way of permitting the light 10 to remain facing straight ahead notwithstanding the steering of the vehicle.

I claim:

1. Operating mechanism for a dirigible head light of a vehicle having the usual steering gear and comprising means for supporting the head light for rotation, a motor adjacent the head light including a cylinder, and oppositely disposed pistons in the cylinder, means for transmitting the motion of the pistons to the head light including a lever having one end interposed between and actuated by the pistons and connected to the head light, spring means coacting with the pistons for urging them to engage the lever, a pump mounted on the vehicle and including a cylinder, oppositely disposed pistons mounted in the pump cylinder, an actuating lever operated from the steering gear and having one end interposed between and engaged with the pump pistons for actuating the same, spring means for urging the pump pistons to engage the lever, and connections between the cylinders.

2. Operating mechanism for a dirigible head light of a vehicle having the usual steering gear and comprising means for supporting the head light for rotation, a fluid pressure motor operatively connected to the head light and operable when actuated to turn the head light, a pump mounted on the vehicle and including a cylinder connected to the fluid pressure motor, oppositely disposed pistons in the pump cylinder, a lever actuated from the steering gear and driving the pistons and spring means for urging the pistons to co-act with the lever, said pistons having reduced ends whereby the amount of movement imparted to the pistons from the lever is limited without limiting movement of the lever.

3. Operating mechanism for a dirigible head light of a vehicle having the usual steering gear and comprising means for supporting the head light for rotation, a fluid pressure motor operatively connected to the head light and operable when actuated to turn the head light, a pump mounted on the vehicle and including a cylinder connected to the fluid pressure motor, oppositely disposed pistons in the pump cylinder, a lever actuated from the steering gear and driving the pistons and spring means for urging the pistons to co-act with the lever, said pistons having reduced ends whereby the amount of movement imparted to the pistons from the lever is limited without limiting movement of the lever and a stop for limiting the movement of the piston following the lever under the action of the spring means.

4. In combination, a dirigible head light, a mounting for supporting the head light for rotation and having spring biased means for normally holding the head light facing straight ahead, means for turning the head light including an arm fixed to the head light and having a slot, a driving lever having a pin co-acting with the slot, said arm having a flange engageable with the pin when the head light is elevated and turned whereby the head light may be supported in position for use as a trouble light.

In witness whereof, I hereto affix my signature.

THOMAS C. HOLLIDAY.